US008036875B2

(12) United States Patent
Nakashima et al.

(10) Patent No.: US 8,036,875 B2
(45) Date of Patent: Oct. 11, 2011

(54) AUDIO GUIDANCE SYSTEM HAVING ABILITY TO UPDATE LANGUAGE INTERFACE BASED ON LOCATION

(75) Inventors: Kazuhiro Nakashima, Kariya (JP); Toshio Shimomura, Kariya (JP); Kenichi Ogino, Toyota (JP); Kentaro Teshima, Kariya (JP)

(73) Assignee: Denso Corporation, Kariya, Aichi-Pref. (JP)

( * ) Notice: Subject to any disclaimer, the term of this patent is extended or adjusted under 35 U.S.C. 154(b) by 657 days.

(21) Appl. No.: 12/164,749

(22) Filed: Jun. 30, 2008

(65) Prior Publication Data

US 2009/0024394 A1 Jan. 22, 2009

(30) Foreign Application Priority Data

Jul. 17, 2007 (JP) ................................ 2007-186162

(51) Int. Cl.
*G06F 17/28* (2006.01)

(52) U.S. Cl. ................. 704/3; 704/275; 704/277; 704/8

(58) Field of Classification Search .................. 704/275, 704/3, 277, 8

See application file for complete search history.

(56) References Cited

U.S. PATENT DOCUMENTS 6,138,009 A * 10/2000 Birgerson ..................... 455/419
7,272,377 B2 * 9/2007 Cox et al. ...................... 455/403
2004/0064318 A1 * 4/2004 Niemoeller et al. ....... 704/270.1
2007/0054672 A1 3/2007 Onishi et al.
2009/0143081 A1 6/2009 Onishi et al.

FOREIGN PATENT DOCUMENTS

CN 101090517 12/2007
EP 1 273 887 1/2003
EP 1 273 887 A2 * 1/2003
JP 08-124092 * 5/1996
JP 8-124092 5/1996
JP 2001-115705 4/2001
JP 2006-148468 6/2006

OTHER PUBLICATIONS

Japanese Office Action dated May 26, 2009, issued in corresponding Japanese Application No. 2007-186162, with English translation.
Korean Office Action dated Nov. 30, 2009, issued in corresponding Korean Application No. 10-2008-0068829, with English translation.
Japanese Office Action dated Jan. 12, 2010, issued in corresponding Japanese Application No. 2007-186162, with English translation.
Chinese Office Action dated Sep. 11, 2009, issued in corresponding Chinese Application No. 200810132548.6, with English translation.

* cited by examiner

*Primary Examiner* — Vincent P Harper
(74) *Attorney, Agent, or Firm* — Nixon & Vanderhye PC

(57) ABSTRACT

A CPU of a speech ECU acquires vehicle position information. If it is determined from the position information and map data stored in a memory that the vehicle has moved between areas where different languages are spoken as dialects or official languages, the CPU determines a language corresponding to the vehicle position information and transmits a request signal to a speech information center to transmit speech information in the language. By receiving the speech information from the speech information center, the CPU updates speech information pre-stored in the memory with the speech information transmitted from the speech information center.

11 Claims, 8 Drawing Sheets

AUDIO GUIDANCE SYSTEM HAVING ABILITY TO UPDATE LANGUAGE INTERFACE BASED ON LOCATION

CROSS REFERENCE TO RELATED APPLICATION

This application is based on and incorporates herein by reference Japanese Patent Application No. 2007-186162 filed on Jul. 17, 2007.

FIELD OF THE INVENTION

The present invention relates to an audio guidance system, which provides audio guidance in a plurality of languages.

BACKGROUND OF THE INVENTION

Systems for providing audio guidance according to the related art include, for example, an on-vehicle navigation system disclosed in JP 8-124092A. In this on-vehicle navigation system, an intersection guidance control process is executed by a map display control unit such that the current position of a controlled vehicle detected by a current position detection process will be displayed on a map of the relevant region read from a map data storing unit and displayed on a CRT display device. Further, the intersection guidance control process is executed to read a dialect or foreign language stored in a language database memory. The control process controls speech synthesis such that speech in the dialect or foreign language will be output to provide guidance for a right or left turn at an intersection, an announcement of the name of a place toward which the vehicle is headed after the right or left turn, or an instruction on a device operation. Thus, the speech of audio guidance is adapted to the dialect or language spoken in the region or country where the vehicle is traveling.

However, this on-vehicle navigation apparatus is required to have a storage device to store audio information in dialects spoken in various regions of a country or major languages in the world. Thus a storage device having an increased storage capacity results in an increase in the cost of the apparatus.

SUMMARY OF THE INVENTION

It is therefore an object of the present invention to provide an audio guidance system, which provides audio guidance adaptable to a plurality of languages while suppressing cost increase attributable to an increase in the storage capacity of a storage device.

An audio guidance system is provided as including a speech information center and an electronic apparatus. The speech information center stores speech information in a plurality of languages and performs communication with outside. The electronic apparatus detects a position of the electronic apparatus, stores speech information used for audio guidance, provides audio guidance using the stored speech information. The electronic apparatus further communicates with the speech information center and updates the stored speech information by acquiring speech information in a language corresponding to the detected position information.

In place of detecting the position and receiving the speech information in correspondence to the detected position, the electronic apparatus may store specific information specific to the electronic apparatus and update the stored speech information by acquiring speech information in a language corresponding to the stored specific information.

The electronic apparatus may detect the position and store the specific information to update the speech information based on either the detected position information or the specific information by, which may be instructed by a user.

BRIEF DESCRIPTION OF THE DRAWINGS

The above and other objects, features and advantages of the present invention will become more apparent from the following detailed description made with reference to the accompanying drawings. In the drawings.

DETAILED DESCRIPTION OF THE PREFERRED EMBODIMENT

First Embodiment

Figure 1:
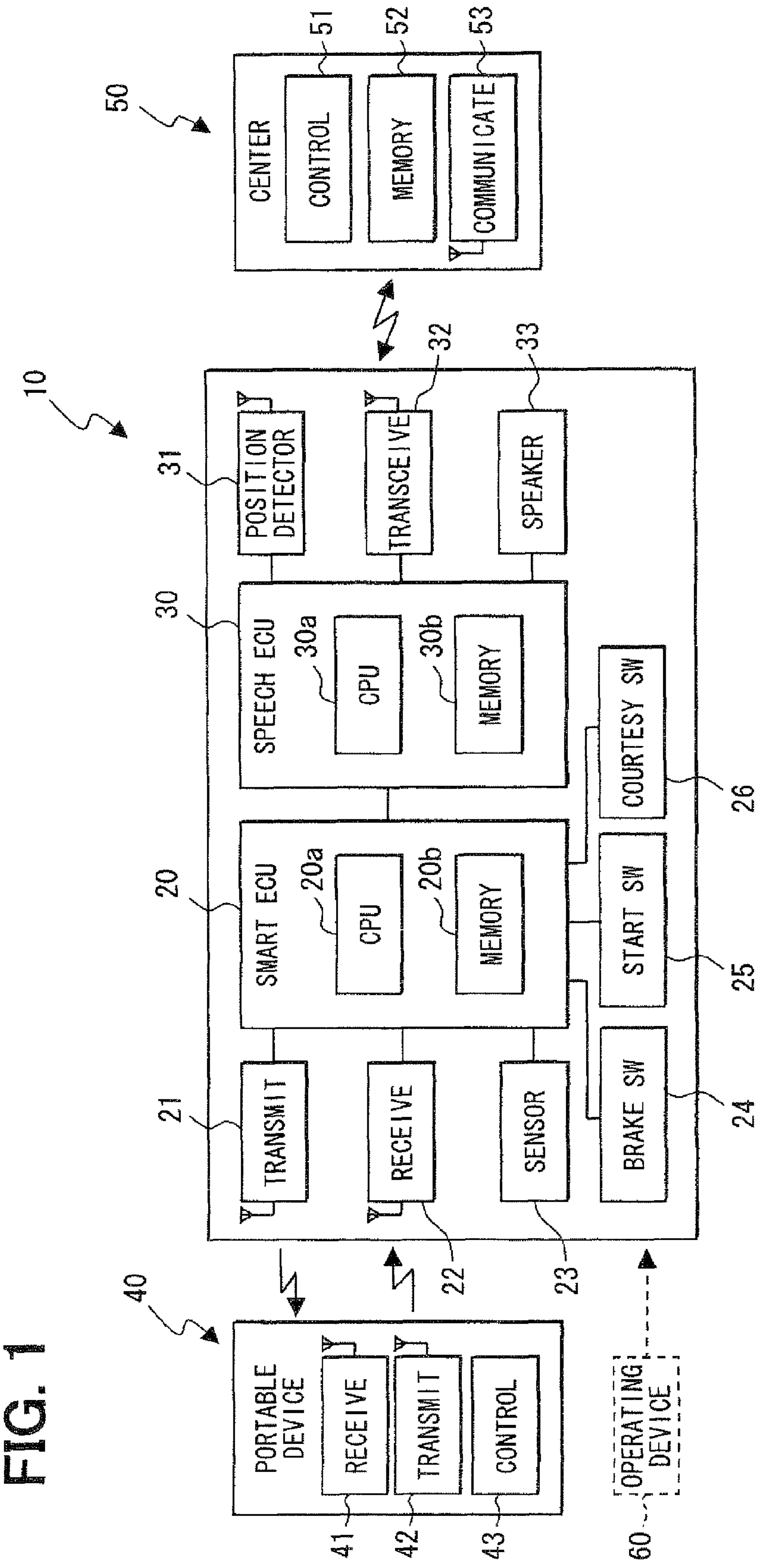
FIG. 1 is a block diagram showing a smart key system including an audio guidance system according to a first embodiment of the invention.

Referring first to FIG. 1, an audio guidance system is shown as being provided in a smart key apparatus of a vehicle. The smart key system includes a smart key apparatus (electronic apparatus) 10 provided in a vehicle, a portable device 40 which can be carried by a user, and a speech information center 50 which can communicate with the smart key apparatus 10, for example, through the internet. The speech information center 50 is located separately and usually away from the vehicle and may be any data station.

The smart key apparatus 10 includes a smart ECU 20 which is connected to transmitters 21, a receiver 22, touch sensors 23, a brake switch 24 (brake SW), a start switch 25 (start SW), and a courtesy switch 26 (courtesy SW). The apparatus also includes a speech ECU 30 which is connected to a position detector 31, a transceiver (transmitter/receiver) 32, and a speaker 33. The smart ECU 20 and the speech ECU 30 are connected to each other.

The smart ECU 20 (CPU 20*a*) of the smart key apparatus 10 controls locking and unlocking of each door (not shown), power supply conditions, and starting of an engine based on the result of verification of an ID code carried out through mutual communication (bidirectional communication) between the smart ECU 20 (the transmitter 21 and the receiver 22) provided on the vehicle and the portable device (electronic key) 40 including a receiver 41 and a transmitter 42.

The transmitters 21 include exterior transmitters provided on respective doors (not shown) of the vehicle and an interior transmitter provided inside the compartment. Each transmitter 21 transmits a request signal based on a transmission instruction signal from the smart ECU 20. For example, the strength of the request signal of the transmitter 21 is set to correspond to a reach of the request signal in the range from about 0.7 to 1.0 m (in the case of the exterior transmitters) or set to correspond to a reach of the request signal within the compartment (in the case of the interior transmitter). Therefore, the smart ECU 20 forms a detection area around each door in accordance with the reach of the request signal using the exterior transmitter to detect that a holder (user) of the portable device 40 is near the vehicle. The smart ECU 20 also forms a detection area inside the compartment in accordance with the reach of the request signal using the interior transmitter to detect that the portable device 40 is located inside the vehicle.

The receiver 22 is for receiving a response signal in timed relation with the output of a transmission instruction signal to the transmitter 21 to receive a response signal transmitted from the portable device 40. The response signal received by the receiver 22 is output to the smart ECU 20. Based on an ID code included in the received response signal, the smart ECU 20 checks whether to execute control over door locking or unlocking, power supply transitions, or starting of the engine.

The touch sensors 23 are provided at respective door outside handles (door handles) of doors of the vehicle. Each sensor 23 detects that the holder (user) of the portable device 40 has touched the door handle and outputs a resultant detection signal to the smart ECU 20. Although not shown, a door ECU and a locking mechanism are provided for each door. When the sensor 23 is touched by the user with the verification of the ID code transmitted from the portable device 40 indicating a predetermined correspondence or authorization, the door ECU operates the locking mechanism at each door according to an instruction signal from the smart ECU 20 to lock each door.

The brake switch 24 is provided in the compartment to be operated by the user, and the switch 24 outputs a signal indicating whether the brake pedal (not shown) has been operated or not by the user. The start switch 25 is provided in the compartment to be operated by the user, and the switch outputs a signal indicating that it has been operated by the user to the smart ECU 20. The courtesy switches 26 detect opening and closing of doors of the vehicle including a luggage door and transmit detection signals to the smart ECU 20.

The smart ECU 20 includes a CPU 20*a* and a memory 20*b*. The CPU 20*a* executes various processes according to programs pre-stored in the memory 20*b*. For example, the CPU 20*a* controls the locking and unlocking of the doors as described above. In addition, when the vehicle is parked and the doors are locked, the CPU 20*a* sequentially outputs the request signals or transmission request signals to the transmitters 21 at each predetermined period which is a preset short time interval of about 0.3 seconds. The smart ECU 20 also outputs an instruction signal to the speech ECU 30 to instruct it to provide audio guidance. An ID code for verification is also stored in the memory 20*b*.

The speech ECU 20 is a computer including also a CPU 30*a* and a memory 30*b*. The CPU 30*a* executes various processes according to programs pre-stored in the memory 30*b*. For example, the CPU 30*a* provides audio guidance by outputting speech from the speaker 33 using speech information in a language stored in the memory 30*b* based on an instruction signal from the smart ECU 20.

The memory 30*b* stores speech information used to provide audio guidance in one to three languages (for example, a first language and a second language) among dialects (languages) spoken in various regions of a country or among languages spoken in the world. When speech information in only one language is stored in the memory 30*b*, the CPU 30*a* provides audio guidance using speech information in only that language. When speech information in two or three languages is stored in the memory 30*b*, the CPU 30*a* provides audio guidance using speech information in any of the languages selected by the user.

It is presumed in the present embodiment that speech information in only one language is stored in the memory 30*b*. The speech information stored in the memory 30*b* is updated according to the position of the vehicle. In other words, the speech information stored in the memory 30*b* is speech information in a language that is associated with the vehicle (smart key apparatus 10) position. Such updating of the speech information will be detailed later. Map data for updating the speech information (language) according to the vehicle position is also stored in the memory 30*b*. The map data represents association between data of locations (areas) and languages spoken in the locations, and the data indicates the language spoken in a location of interest. Therefore, the memory 30*b* sufficiently works if it has a storage capacity allowing storage of the programs, the map data, and the speech information in one to three languages.

The position detector 31 detects the position of the vehicle. The detector 31 includes a terrestrial magnetism sensor for detecting the azimuth of a travelling direction of the vehicle, a gyro sensor for detecting an angular velocity of the controlled vehicle around a vertical axis, a distance sensor for detecting a distance traveled by the vehicle, and a GPS receiver of a GPS (Global Positioning System) for detecting the current position of the vehicle. The position detector 31 outputs a signal indicating the position of the vehicle thus detected (position information) to the speech ECU 30. Since those sensors have respective errors of different nature, the plurality of sensors are configured to be used such that they complement each other. Some of the sensors may alternatively be deleted from the position detector depending on the accuracy of each sensor. When a navigation apparatus is provided in the vehicle, a position detector and a map storing unit of the navigation apparatus may be used such that they also serve as a map database and the position detector 31.

The transceiver (electronic apparatus-side communication means) 32 communicates with the external speech information center 50 (communication unit 53) through, for example, the internet. The speaker 33 is provided inside the compartment to output speech of audio guidance.

The portable device 40 includes a receiver 41 for receiving a request signal from a transmitter 21 provided on the vehicle, a transmitter 42 for transmitting a response signal including an ID code in response to the request signal thus received, and a control unit 43 for controlling the portable device 40 as a whole. The control unit 43 is connected to the receiving unit 41 and the transmitter 42. For example, based on a reception signal from the receiving unit 41, the control unit checks whether a request signal has been received or not, generates a response signal including the ID code, and causing the transmitter 42 to transmit the response signal.

The speech information center 50 includes a control unit 51 controlling the speech information center 50 as a whole, a storage unit (center side storage means) 52 in which speech information in dialects (languages) spoken in various domestic regions and major languages spoken in the world is stored, and a communication unit (center side communication means) 53 for communication with the transceiver 32. The speech information center 50 distributes speech information for audio guidance to vehicles.

Processes executed by the audio guidance system in the first embodiment will now be described.

First, a door locking process executed by the smart key system will be described with reference to FIG. 2.

Figure 2:
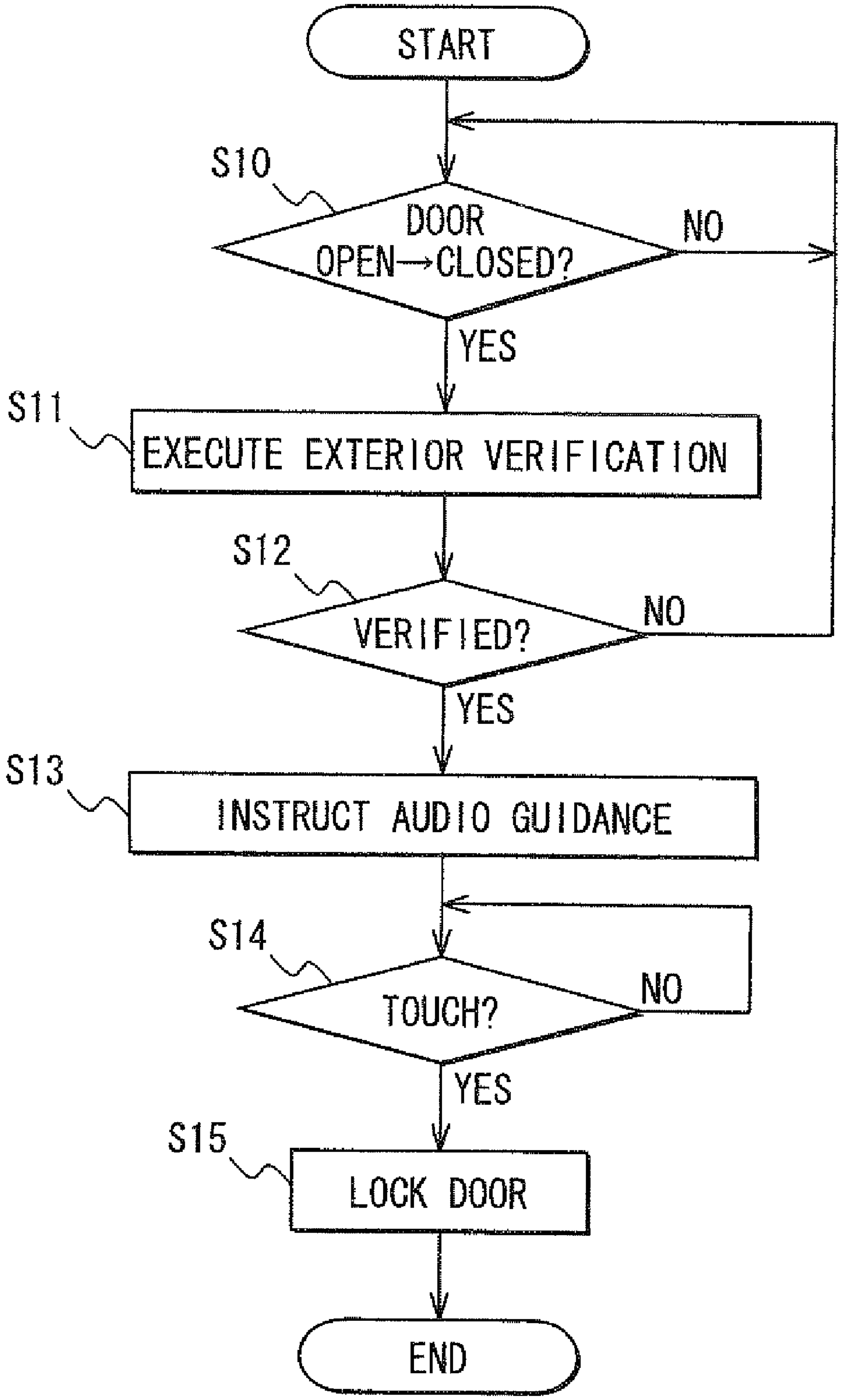
FIG. 2 is a flowchart showing a door locking process of the smart key system.

At step S10 shown in FIG. 2, the CPU 20*a* checks whether a door has been closed, that is, whether a door has changed from an open state to a closed state, from the state of the courtesy switch 26 associated with such a door. If it is determined that the door has been closed, the process proceeds to step S1I. If it is determined that the door has not been closed, the process returns to step S10.

At step S11, the CPU 20*a* executes exterior verification. Specifically, the CPU 20*a* causes the exterior transmitter of the relevant transmitter 21 to transmit the request signal, causes the receiver 22 to receive the response signal from the portable device 40, and verifies the ID code included in the received response signal.

When the verification at step S11 results in an affirmative determination (verified) at step S12 (the ID code included in the received response signal has a predetermined match with the ID code for verification stored in the memory 20*b*), the CPU 20*a* proceeds to step S13. If it is determined that the verification has failed, the process returns to step S10.

At step S13, the CPU 20*a* outputs an instruction signal to the speech ECU 30. According to the instruction signal from the CPU 20*a*, the CPU 30*a* executes audio guidance by outputting speech from the speaker (speech output means) 33 using speech information in the language stored in the memory 20*b*. The content of the speech guidance at this stage may be a statement saying "the door will be locked by touching the door handle".

At step S14, the CPU 20*a* checks whether the user has touched the door handle or not according to the relevant sensor 23. If it is determined that the user has touched the door handle (when the sensor has detected a touch), the process proceeds to step S15. If it is determined that the user has not touched the door handle (when the sensor has detected no touch), the determination at step S14 is repeated. At step S15, the CPU 20*a* operates the door ECU and the locking mechanism of the each door to lock the door.

Figure 3:
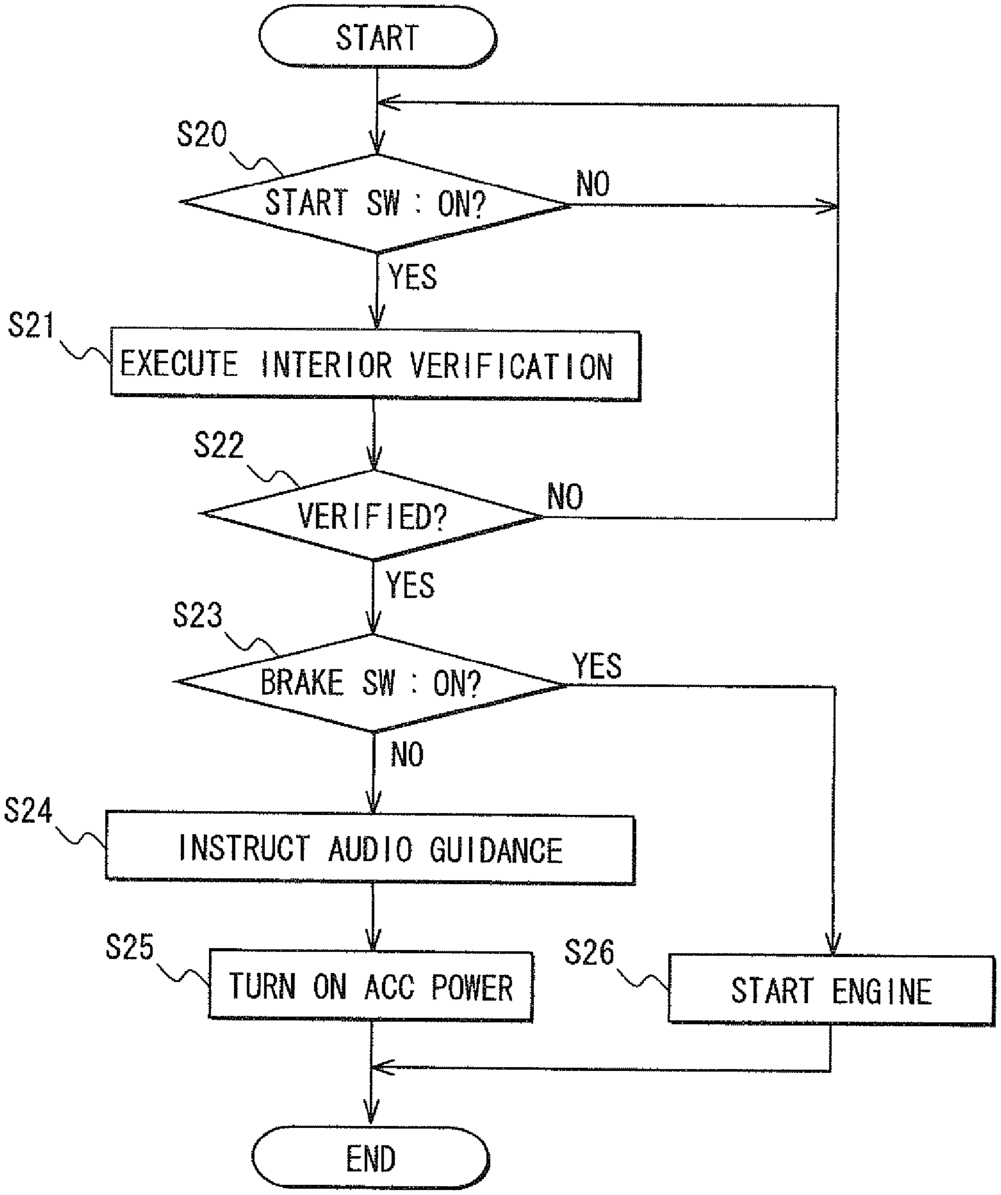
FIG. 3 is a flowchart showing a power supply process executed in the first embodiment.

A power supply process of the smart key system will now be described with reference to FIG. 3.

At step S20, the CPU 20*a* checks whether the start switch 25 has been turned on or not by checking a signal from the start switch 25. If it is determined that the switch has been turned on, the process proceeds to step S21. If it is determined that the switch is in the off state, the process returns to step S20.

At step S21, the CPU 20*a* executes interior verification. Specifically the CPU 20*a* causes the interior transmitter of the relevant transmitter 21 to transmit the request signal in the compartment, causes the receiver 22 to receive the response signal from the portable device 40, and verifies the ID code included in the received response signal.

When the verification at step S21 results in an affirmative determination (verified) at step S22 (the ID code included in the received response signal has a predetermined match with the ID code for verification stored in the memory 20*b*), the CPU 20*a* proceeds to step S23. If it is determined that the verification has failed, the process returns to step S20.

At step S23, in order to check whether the brake pedal has been operated or not, the CPU 20*a* checks the signal from the brake switch 24 to check whether the brake switch 24 is in the on or off state. When the switch is determined to be in the on state, the process proceeds to step S26. When the switch is determined to be in the off state, the process proceeds to step S24.

At step S26, the CPU 20*a* outputs an instruction signal to instruct a power supply ECU (not shown) and an engine ECU (not shown) to start the engine.

At step S24, the CPU 20*a* outputs an instruction signal to the speech ECU 30. According to the instruction signal from the CPU 20*a*, the CPU 30*a* executes audio guidance by outputting speech from the speaker 33 using speech information in the language stored in the memory 20*b*. The content of the speech guidance at this stage may be a statement saying "Please step on the brake pedal to operate the start switch". At step S25, the CPU 20*a* outputs an instruction signal to the power supply ECU (not shown) to instruct it to turn on the power supply (ACC) for accessory devices.

As thus described, the smart key system of the present embodiment provides audio guidance when the doors of the vehicle are locked or when the power supply of the vehicle is switched on/off.

In order to improve the user friendliness of such an audio guidance system, it is desirable to adapt the system to a greater number of languages. For this purpose, speech information may be stored in the memory 30*b* in dialects (languages) spoken in various regions of a country or in major languages spoken in the world. However, in order to store speech information in the memory 30*b* in dialects (languages) spoken in various regions of a country or in major languages spoken in the world, the storage capacity of the memory 30*b* must be increased, which results in a cost increase. In the present embodiment, therefore, speech information stored in the memory 30*b* is updated depending on the position of the vehicle to provide audio guidance in a plurality of languages while avoiding a cost increase attributable to an increase in the storage capacity of the memory 30*b*.

Figure 4:
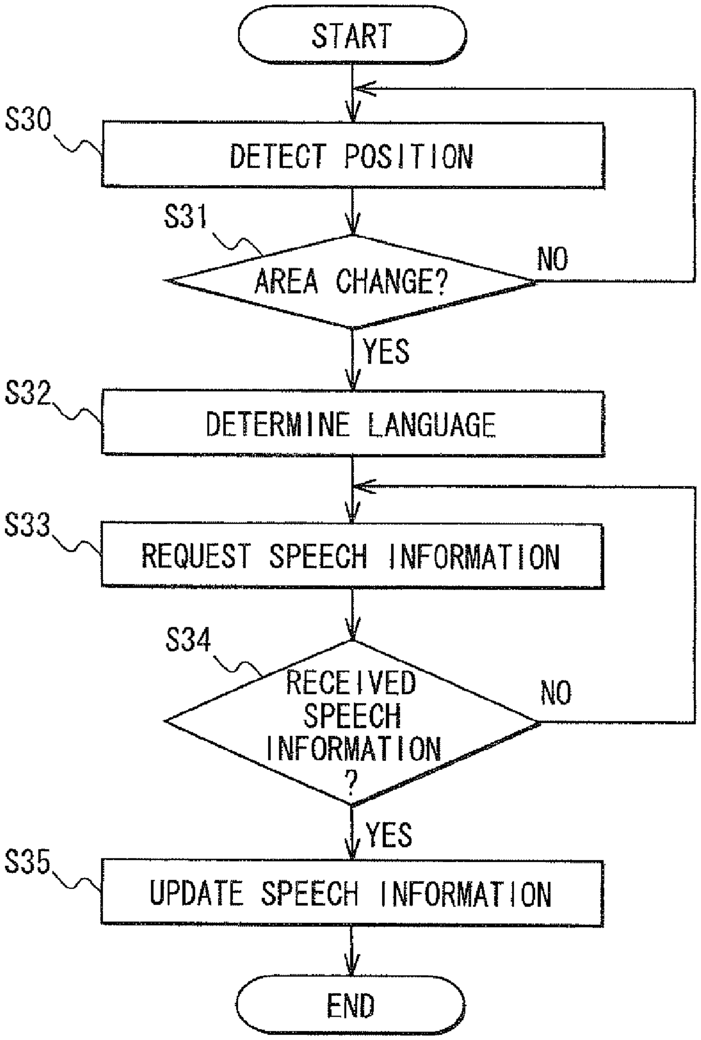
FIG. 4 is a flowchart showing a process executed in the first embodiment.
Figure 5:
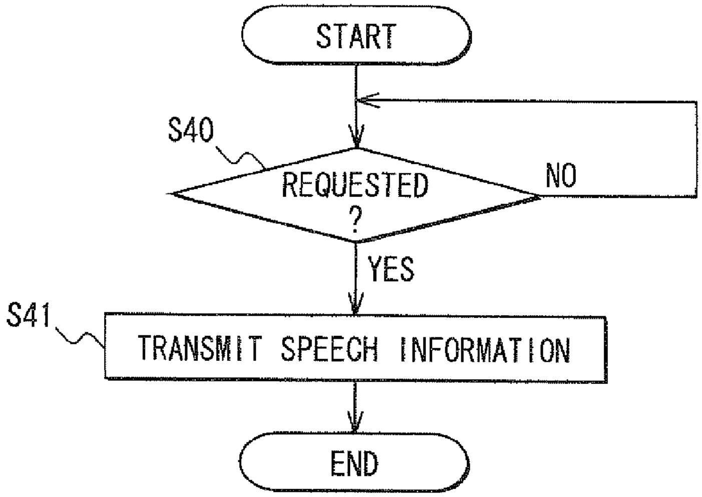
FIG. 5 is a flowchart showing a process executed at a speech information center in the first embodiment of the invention.

A speech information updating process in the smart key system of the present embodiment will now be described with reference to FIGS. 4 and 5. The flowchart shown in FIG. 4 is implemented while power is supplied to the smart key apparatus 10. The flowchart shown in FIG. 5 is implemented while power is supplied to the speech information center 50 (including the control unit 51 and so on).

At step S30, the CPU 30*a* detects the position of the vehicle using the position detector 31. That is, the CPU 30*a* acquires position information detected by the position detector 31. The purpose is to determine whether the vehicle position has moved between areas where different languages are spoken as dialects or official languages.

At step S31, the CPU 30*a* checks whether or not the area has been changed. If it is determined that the area has been changed, the process proceeds to step S32. If it is determined that the area has not been changed, the process returns to step S30. That is, the CPU 30*a* determines from the position information acquired from the position detector 31 in step S30 and map data stored in the memory 30*b* whether or not the vehicle position has moved between areas where different languages are spoken as dialects or official languages. Thus, a determination can be made on whether to update speech information or not.

At step S32, the CPU 30*a* determines the language to be used to update the speech information according to the position of the vehicle (position information). That is, the dialect or official language spoken in the area into which the vehicle has moved is used for the update.

At step S33, the CPU 30*a* transmits a request signal to the speech information center 50 using the transceiver 32 to request the center 50 to transmit speech information in the language according to the vehicle position (position information).

At step S34, the CPU 30*a* checks whether speech information from the speech information center 50 has been received by the transceiver 32 or not. If it is determined that speech information has been received, the process proceeds to step S35. If it is determined that no speech information has been received, the process returns to step S33.

At step S35, the CPU 30*a* updates the speech information in the memory 30*b*. Specifically, the CPU 30*a* updates the speech information stored in the memory 30*b* by overwriting it with the speech information transmitted from the speech information center 50.

At step S40, the control unit 51 of the speech information center 50 checks whether there is a request for speech information or not from whether a request signal has been received by the communication unit 53 or not. If it is determined that there is a request, the process proceeds to step S41. If it is determined that there is no request, the process returns to step S40.

At step S41, the control unit 51 of the speech information center 50 extracts speech information in the language corresponding to the received request signal from the storage unit 52 and transmits the extracted speech information to the transceiver 32 of the smart key apparatus 10 through the communication unit 53.

Since the speech information used for audio guidance is updated by acquiring new information from the speech information center 50 according to position information, there is no need for pre-storing speech information in all plural languages in the memory 30*b*. Thus, an increase in the storage capacity of the memory 30*b* can be avoided. It is therefore possible to provide audio guidance in one of different languages most suitable in that traveling area while avoiding a cost increase attributable to an increase in the storage capacity of the memory 30*b*.

Further, since the language to be used is determined at the vehicle side (smart key apparatus 10) according to the vehicle position (position information) as thus described, it is advantageous in that the speech information center 50 may have a simple configuration only for transmitting speech information in a language according to a request signal.

(Modification)

Figure 6:
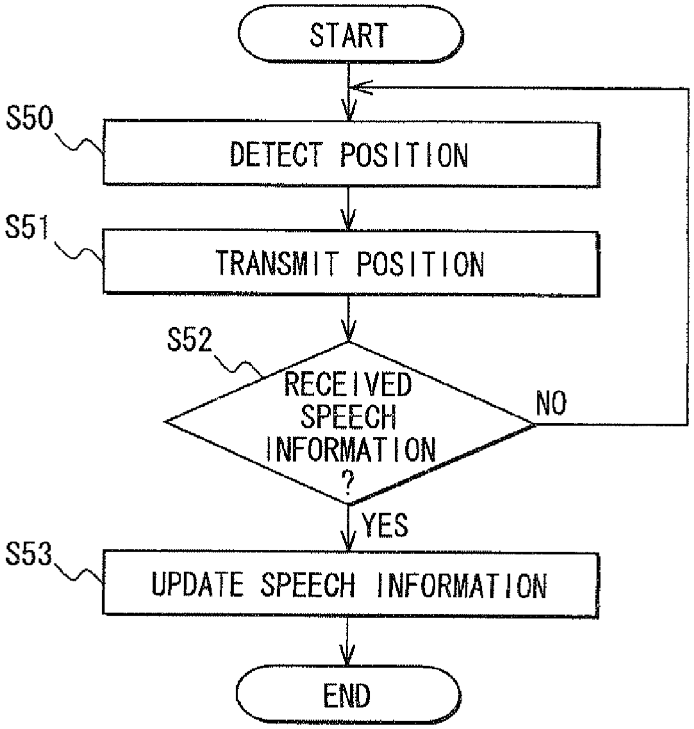
FIG. 6 is a flowchart showing a process executed on a vehicle side in a modification of the first embodiment.
Figure 7:
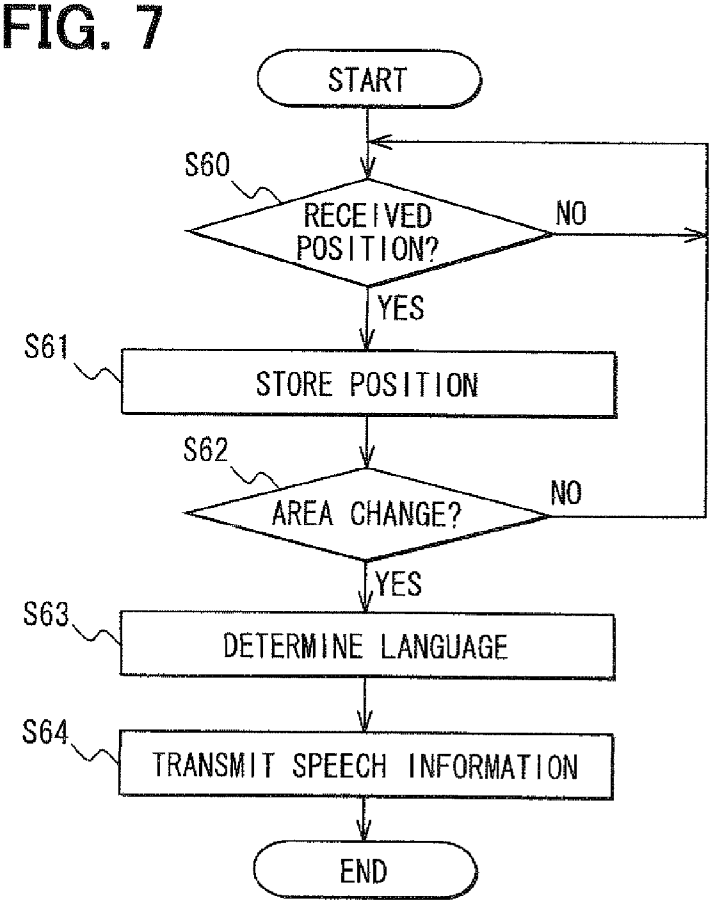
FIG. 7 is a flowchart showing a process executed at a speech information center in the modification of the first embodiment of the invention.

As a modification to the first embodiment, speech information adopted for updating may be determined at the speech information center 50. Such a modification will be described with emphasis put on its differences from the first embodiment because the modification is similar to the first embodiment in most points. The configuration of the modification will not be described because it is generally similar to the configuration of the first embodiment (FIG. 1). The processes executed at a vehicle side of a smart key system the processes executed at the center 50 side of the smart key system according to the modification of the first embodiment are shown in FIGS. 6 and 7. Map data is stored in the storage unit 52 of the speech information center 50 in this modification, whereas map data is stored in the memory 30*b* in the first embodiment.

A speech information updating process of the smart key system of the present modification will now be described with reference to FIGS. 6 and 7. The flowchart shown in FIG. 6 is implemented while power is supplied to a smart key apparatus 10. The flowchart shown in FIG. 7 is implemented while power is supplied to the speech information center 50 (control unit 50 and etc.).

At step S50, the CPU 30*a* of the speech ECU 30 detects the position of the vehicle using the position detector 31 just as done at step S30 shown in FIG. 4.

At step S51, the CPU 30*a* transmits the position (position information) detected by the position detector 31 at step S50 to the speech information center 50 through the transceiver 32.

At step S52, the CPU 30*a* checks whether speech information from the speech information center 50 has been received at the transceiver 32 just as done at step S34 in FIG. 4. If it is determined that the speech information has been received, the process proceeds to step S53. If it is determined that no speech information has been received, the process returns to step S50.

At step S53, the CPU 30*a* updates the speech information in the memory 30*b* just as done at step S35 in FIG. 4. Specifically, the CPU 30*a* updates the speech information stored in the memory 30*b* by overwriting it with the speech information transmitted from the speech information center 50.

At step S60 shown in FIG. 7, the control unit 51 of the speech information center 50 checks whether the position information has been received by the communication unit 53 or not. If it is determined that the position information has been received, the process proceeds to step S61. If it is determined that no position information has been received, the process returns to step S60.

At step S61, the control unit 51 of the speech information center 50 stores the position information received by the communication unit 53 in the storage unit 52 for determining whether the vehicle has entered a different language area or not.

At step S62, the control unit 51 of the speech information center 50 checks whether the vehicle has entered the different language area or not (area change) based on the position information received by the communication unit 53 and past position information stored in the storage unit 52. If it is determined that the vehicle has entered the different area, the process proceeds to step S63. If it is determined that the vehicle has not entered a different area, the process returns to step S60. Specifically, the control unit 51 of the speech information center 50 determines from the position information received by the communication unit 53 at step S60 and the position information stored in the storage unit 52 and the map data whether or not the vehicle position has moved between areas where different languages are spoken as dialects or official languages. Thus, a determination can be made on whether to update the speech information or not.

At step S63, the control unit 51 of the speech information center 50 determines the language corresponding to the vehicle position (position information) or the dialect or official language spoken in the area which the vehicle has entered as the language to be used to update the speech information (to be transmitted to the smart key apparatus 10 (transceiver 32)) (center-side determination means). Thus, it is possible to determine the language to be used according to the vehicle position (position information).

At step S64, the control unit 51 of the speech information center 50 transmits speech information in the language according to the vehicle position (position information) to the smart key apparatus 10 (transceiver 32) through the communication unit 53.

The language according to the vehicle position (position information) is determined at the speech information center 50 as thus described. Therefore, the modification is advantageous in that the smart key apparatus 10 can update the speech information by acquiring new information in a language corresponding to the position information using a simple configuration only for transmitting the position information to the speech information center 50.

In the first embodiment and the modification thereof, a language corresponding to the vehicle position is determined by the smart key apparatus 10 or the speech information center 50. However, it is also possible as long as the transceiver 32 communicates with the communication unit 53 of the speech information center 50 to update the speech information stored in the memory 30*b* by acquiring speech information in a language corresponding to the position detected by the position detector 31 (position information) from the storage unit 52 at the speech information center 50.

Second Embodiment

A second embodiment is similar to the first embodiment and is different from the first embodiment in that specific information (destination information) is used instead of position information as information for updating speech information. The configuration of the present embodiment is different in that information specific to the vehicle or the smart key apparatus 10 (the vehicle identification number of the vehicle on which the smart key apparatus 10 is mounted, the serial number of the smart key apparatus 10, etc.) is stored in the memory 30*b* (specific information storage means) in association with an area (region or country) and the language spoken in that area.

The speech information updating process of the smart key system according to the present embodiment will now be described with reference to FIG. 8. This processing is implemented while power is supplied to the smart key apparatus 10. The process executed at the speech information center 50 will now be described because it is similar to the process in the first embodiment shown in FIG. 5.

At step S70, the CPU 30*a* of the speech ECU 30 checks specific information stored in the memory 30*b* and contents stored in the memory 30*b* to determine the language which is associated with the specific information. Specifically, the CPU 30*a* determines destination information of the smart key apparatus 10 such as the destination to which the apparatus is shipped from the specific information. The CPU 30*a* checks the destination of shipment and area information associated with the destination information, the area information being the name of an area (region or country) and the language spoken in the area stored in association with each other. Thus, the CPU 30*a* determines the speech information (language) to be transmitted from the speech information center 50. The database containing the specific information (or part of the specific information) and the destination information (information such as a destination of shipment) in association with each other is stored in the memory 30*b* of the smart key apparatus 10. The CPU 30*a* determines the destination from the specific information using the database.

At step S70, the CPU 30*a* checks the language of the speech information stored in the memory 30*b*. When the language determined from the specific information is a language that is not stored in the memory 30*b*, the process proceeds to the next step. When the language is a language which has already been pre-stored, the process may be terminated. A checking on whether to update the speech information or not may be made as thus described.

At step S71, the CPU 30*a* transmits the request signal to the speech information center 50 through the transceiver 32 to request the center 50 to transmit speech information in the language corresponding to the destination information as a language associated with the specific information.

At step S72, the CPU 30*a* checks whether speech information from the speech information center 50 has been received by the transceiver 32 or not. If it is determined that the speech information has been received, the process proceeds to step S73. If it is determined that no speech information has been received, the process returns to step S71.

At step S73, the CPU 30*a* updates the speech information in the memory 30*b*. The CPU 30*a* updates the speech information stored in the memory 30*b* by overwriting it with the speech information transmitted from the speech information center 50.

Since the speech information used for audio guidance is updated by acquiring new information from the speech information center 50 according to the specific information, there is no need for pre-storing speech information in a plurality of languages in the memory 30*b*. Thus, an increase in the storage capacity of the memory 30*b* can be avoided, and it is therefore possible to provide the audio guidance in a plurality of languages while avoiding an increase in the storage capacity of the memory 30*b*.

Further, since the language corresponding to specific information (destination information) is determined at the vehicle side (smart key apparatus 10) as thus described, the embodiment is advantageous in that the speech information center 50 may have a simple configuration only for transmitting speech information in the language according to the request signal.

The destination information of the smart key apparatus 10 is determined from the specific information, and the speech information is updated using the language corresponding to the destination information. Thus, the speech information can be appropriately updated.

(Modification)

Figure 9:
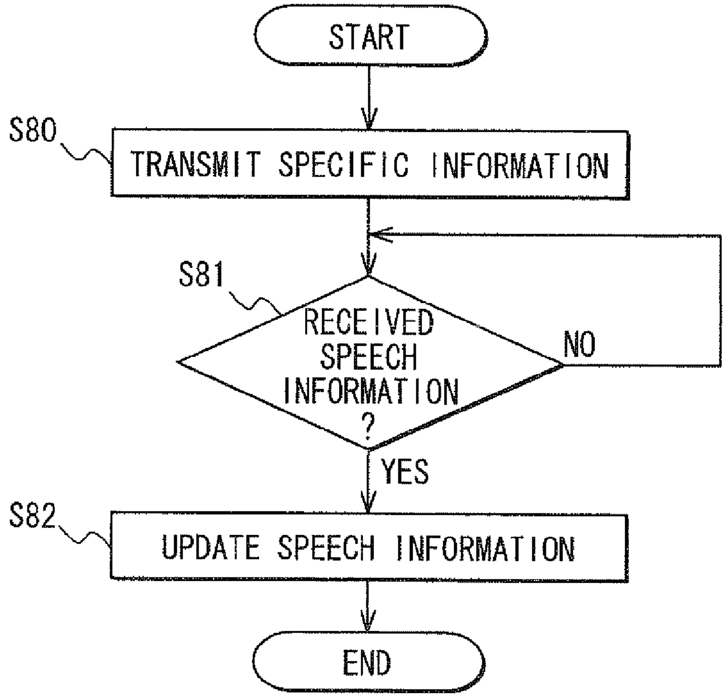
FIG. 9 is a flowchart showing a process executed on a vehicle side in a modification of the second embodiment.

As a modification to the second embodiment, the speech information adopted for updating may be determined at the speech information center 50. Such a modification will be described with FIGS. 9 and 10. In the above second embodiment, the name of an area (region or country) is stored in the memory 30*b* in association with the language spoken in the area. On the contrary, such information is stored in the storage unit 52 of the speech information center 50 in the present modification.

At step S80, the CPU 30*a* of the speech ECU 30 transmits specific information stored in the memory 30*b* to the speech information center 50 through the transceiver 32.

Figure 8:
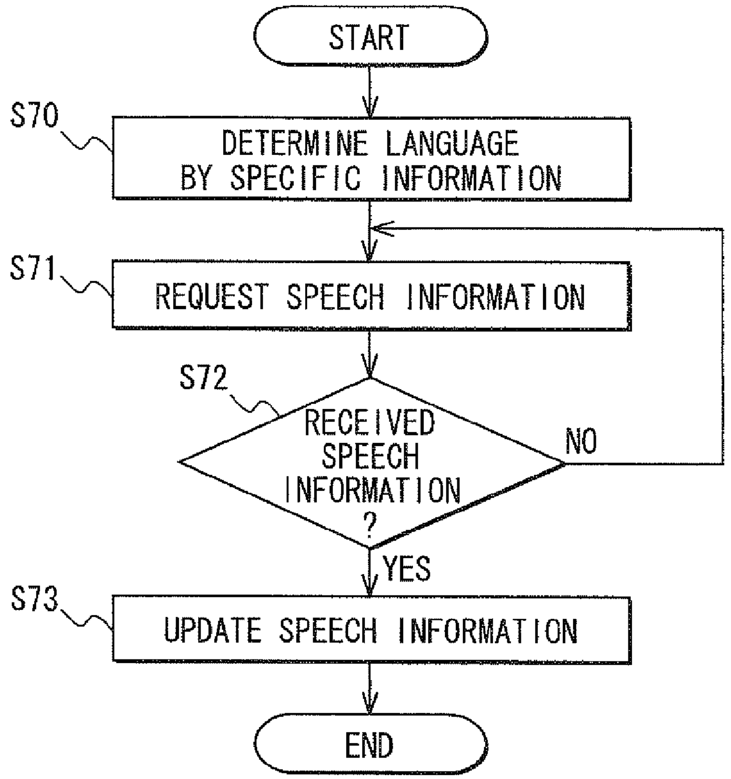
FIG. 8 is a flowchart showing a process executed on a vehicle side in a second embodiment of the invention.

At step S81, the CPU 30*a* checks whether speech information from the speech information center 50 has been received at the transceiver 32 just as done at step S72 in FIG. 8. If it is determined that speech information has been received, the process proceeds to step S82. If it is determined that no speech information has been received, the process returns to step S81.

At step S82, the CPU 30*a* updates the speech information in the memory 30*b* just as done at step S73 shown in FIG. 8. Specifically, the CPU 30*a* updates the speech information stored in the memory 30*b* by overwriting it with the speech information transmitted from the speech information center 50.

Figure 10:
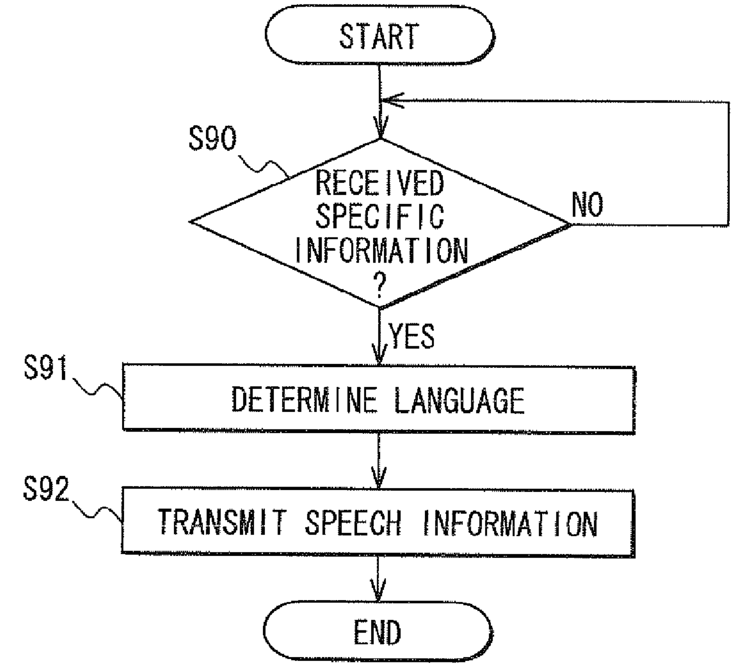
FIG. 10 is a flowchart showing a process executed at a speech information center in the modification of the second embodiment.

At step S90 shown in FIG. 10, the control unit 51 of the speech information center 50 checks whether specific information has been received by the communication unit 53 or not. If it is determined that specific information has been received, the process proceeds to step S91. If it is determined that no specific information has been received, the process returns to step S90.

At step S91, the control unit 51 of the speech information center 50 checks the specific information received by the communication unit 53 and contents stored in the storage unit 52 for determining the language corresponding to the specific information. Specifically, the control unit 51 determines destination information of the smart key apparatus 10 such as the destination to which the apparatus is shipped from the specific information. The control unit 51 determines the destination of shipment and area information associated with the destination information, the area information being the name of an area (region or country) and the language spoken in the area stored in association with each other. Thus, the control unit 51 determines the language of speech information to be used for updating (to be transmitted to the smart key apparatus 10 (transceiver 32)) (center side determining means).

The database containing the specific information (or part of the specific information) and the destination information (information such as a destination of shipment) in association with each other is stored in the storage unit 52. The control unit 51 determines the destination information from the specific information using the database.

At step S92, the control unit 51 of the speech information center 50 transmits the speech information in a language corresponding to the destination information as a language according to the specific information to the smart key apparatus 10 (transceiver 32) through the communication unit 53.

The language corresponding to identification (destination) information is determined at the speech information center 50 as thus described. Therefore, the present modification is advantageous in that the smart key apparatus 10 can update the speech information by acquiring new information in the language corresponding to the position information using a simple configuration only for transmitting specific information to the speech information center 50.

The destination information of the smart key apparatus 10 is determined from the specific information, and the speech information is updated using a language corresponding to the destination information. Thus, the speech information can be appropriately updated.

The present embodiment and the modification of the same have been described as examples in which a language corresponding to identification (destination) information is determined at the smart key apparatus 10 or the speech information center 50. However, it is possible as long as the transceiver 32 communicates with the communication unit 53 of the speech information center 50 to update the speech information stored in the memory 30*b* by acquiring from the storage apparatus 52 of the speech information center 50 speech information in the language corresponding to the specific information stored in the memory 30*b*.

The destination information of the smart key apparatus 10 may be stored as part of the specific information stored in the memory 30*b*. Then, the CPU 30*a* determines the language corresponding to the destination information stored in the memory 30*b* as the language corresponding to the specific information. The CPU transmits the request signal to the speech information center 50 through the transceiver 32 to request the center to transmit speech information in the language thus determined. On the other hand, the control unit 51 of the speech information center 50 may extract speech information in the language according to the request signal from the storage apparatus 52 and transmit the speech information to the smart key apparatus 10 through the communication unit 53. In this case again, the speech information center 50 can be advantageously provided with a simple configuration for only transmitting speech information in the language corresponding to the request signal. The destination information of the smart key apparatus 10 can be determined from the specific information, and the speech information can be updated in the language corresponding to the destination information. Thus, the speech information can be appropriately updated.

When the destination information of the smart key apparatus 10 is stored as part of the specific information stored in the memory 30*b*, the language corresponding to the destination information may be determined at the speech information center 50. In this case, the CPU 30*a* of the smart key apparatus 10 transmits the specific information to the speech information center 50 through the transceiver 32. The control unit 51 of the speech information center 50 may extract the speech information in the language corresponding to the destination information included in the specific information thus received from the storage unit 52, and the unit 51 may transmit the speech information to the smart key apparatus 10 through the communication unit 53. This is advantageous in that the smart key apparatus 10 can update the speech information by acquiring the language that is optimal for the by using a simple configuration for only transmitting the destination information of the apparatus to the speech information center 50.

Third Embodiment

In a third embodiment, identification (user) information is used instead of position information as information for updating speech information. Therefore, the information on the identification of the smart key apparatus 10 (including user information such as information of the native country of the user) is stored in the memory 30*b*.

Figure 11:
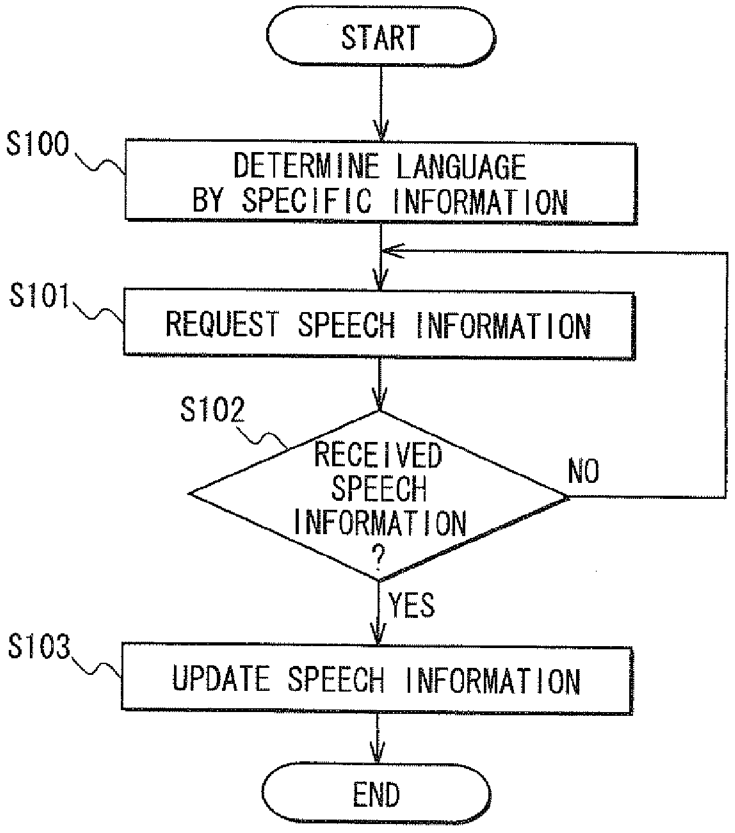
FIG. 11 is a flowchart showing a process executed on a vehicle side in a third embodiment of the invention.

A speech information updating process executed in the smart key system of the present embodiment is shown in FIG. 11. This process is implemented while power is supplied to the smart key apparatus 10. The process at the speech information center 50 is similar to the process in the first embodiment shown in FIG. 5.

At step S100, the CPU 30*a* of the speech ECU 30 checks the specific information stored in the memory 30*b* to determine the language corresponding to the specific information (the native language of the user). Specifically, the CPU 30*a* determines user information (such as native country information) and determines the language corresponding to the user information (the native language of the user) as the language corresponding to the specific information. At step S100, the CPU 30*a* checks languages of speech information stored in the memory 30*b*. When the language (the native language of the user) identified from the user information is a language which is not stored in the memory 30*b*, the process may proceed to the next step. When the language has already been stored in the memory 30*b*, the process may be terminated.

At step S101, the CPU 30*a* transmits the request signal to the speech information center 50 to request the center 50 to transmit the speech information in the language corresponding to the user information.

At step S102, the CPU 30*a* checks whether the speech information has been received from the speech information center 50 or not. If it is determined that the speech information has been received, the process proceeds to step S103. If it is determined that no speech information has been received, the process returns to step S101.

At step S103, the CPU 30*a* updates the speech information in the memory 30*b*. Specifically, the CPU 30*a* of the ECU 30 updates the speech information stored in the memory 30*b* by overwriting it with the speech information transmitted from the speech information canter 50.

Since the speech information used for audio guidance is updated by acquiring new information from the speech information center 50 according to the specific information as thus described, there is no need for pre-storing the speech information in a plurality of languages in the memory 30*b*. Thus, an increase in the storage capacity of the memory 30*b* is not necessary, and it is therefore possible to provide the audio guidance in a plurality of languages while avoiding a cost increase attributable to an increase in the storage capacity of the memory 30*b*.

Since the language corresponding to the identification (user) information is determined at the vehicle side (smart key apparatus 10), this embodiment is advantageous in that the speech information center 50 may have a simple configuration for only transmitting the speech information in a language corresponding to the request signal.

Further, the user information of the smart key apparatus 10 is determined from the specific information, and the speech information is updated in the language corresponding to the user information. Thus, the speech information can be appropriately updated.

(Modification)

As a modification to the third embodiment, speech information adopted for updating may be determined at the speech information center 50. The process executed on the vehicle side of the smart key system is shown in FIG. 12, and the process executed on the center side of the smart key system is shown in FIG. 13.

Figure 12:
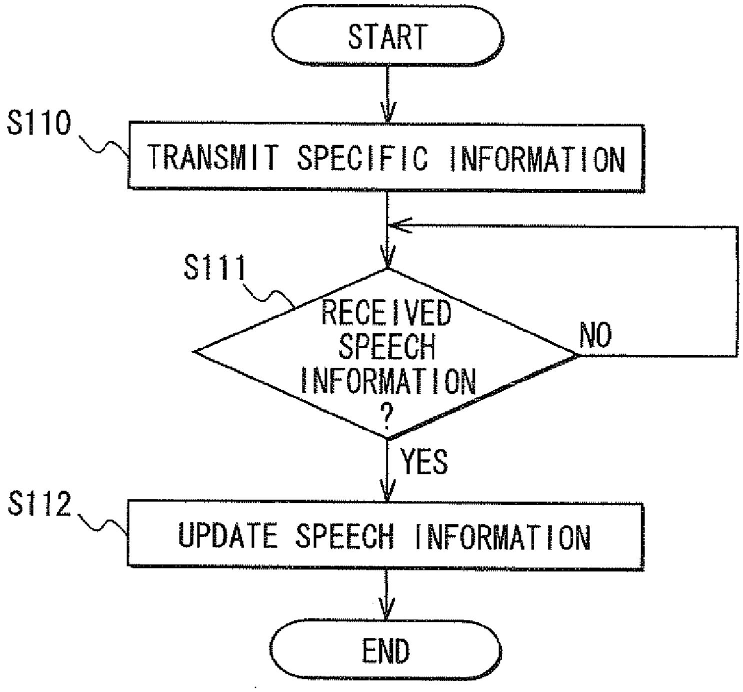
FIG. 12 is a flowchart showing a process executed on a vehicle side in a modification of the third embodiment.
Figure 13:
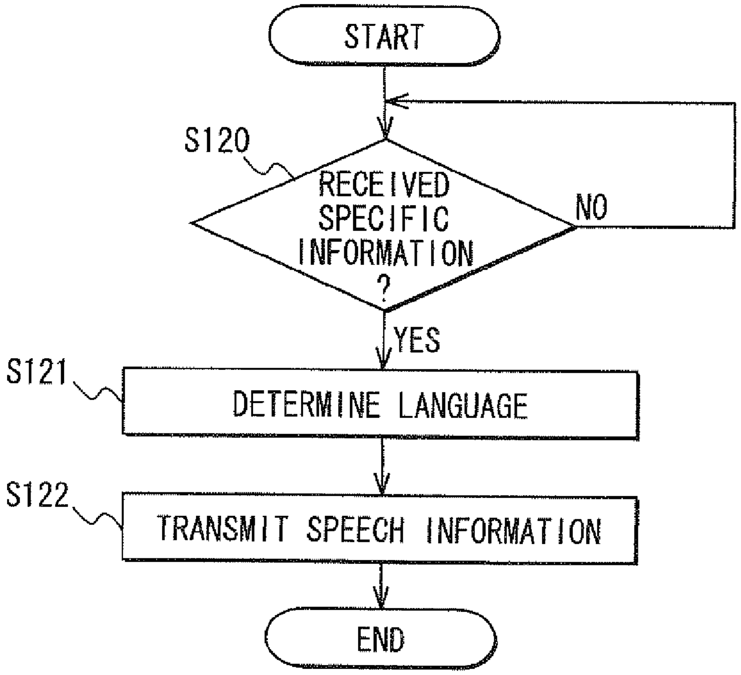
FIG. 13 is a flowchart showing a process executed at a speech information center in the modification of the third embodiment.

The process shown in FIG. 12 is implemented while power is supplied to a smart key apparatus 10. The process shown in FIG. 13 is implemented while power is supplied to the speech information center 50 (control unit 51 and etc.).

At step S110, the CPU 30*a* of the speech ECU 30 transmits the specific information (vehicle identification number of the vehicle on which the smart key apparatus 10 is mounted, the serial number of the smart key apparatus 10, and the like) stored in the memory 30*b* to the speech information center 50 through the transceiver 32.

At step S111, the CPU 30*a* checks whether the speech information from the speech information center 50 has been received at the transceiver 32 just as done at step S102 shown in FIG. 11. If it is determined that speech information has been received, the process proceeds to step S112. If it is determined that no speech information has been received, the process returns to step S111.

At step S112, the CPU 30*a* updates the speech information in the memory 30*b* just as done at step S103 shown in FIG. 8. Specifically, the CPU 30*a* updates the speech information stored in the memory 30*b* by overwriting it with the speech information transmitted from the speech information center 50.

At step S120 shown in FIG. 13, the control unit 51 of the speech information center 50 checks whether the specific information has been received by the communication unit 53 or not. If it is determined that the specific information has been received, the process proceeds to step S121. If it is determined that no specific information has been received, the process returns to step S120.

At step S121, the control unit 51 of the speech information center 50 checks the specific information received at the communication unit 53 and contents stored in the storage unit 52 to determine the language corresponding to the specific information. Specifically, the control unit 51 determines user information from the specific information to determine the language of speech information to be used for updating (to be transmitted to the smart key apparatus 10 (transceiver 32)) (center side determining means).

The database containing the specific information (or part of specific information) and user information (information such as the native country of the user) in association with each other is stored in the storage unit 52. The control unit 51 determines destination information from the specific information using the database.

At step S122, the control unit 51 of the speech information center 50 transmits the speech information in the language corresponding to the identification (user) information to the smart key apparatus 10 (transceiver 32) through the communication unit 53.

Since the language corresponding to identification (user) information is determined at the speech information center 50, the modification is advantageous in that the smart key apparatus 10 can update the speech information by acquiring the speech information in the language corresponding to the specific information using a simple configuration for only transmitting the user information to the speech information center 50.

The embodiment and the modification have been described as examples in which the language corresponding to the identification (user) information is determined at either the smart key apparatus 10 or the speech information center 50. It is possible as long as the transceiver 32 communicates with the communication unit 53 of the speech information center 50 to update the speech information stored in the memory 30*b* by acquiring the speech information in the language corresponding to the identification (user) information stored in the memory 30*b* from the storage unit 52 of the speech information center 50.

The CPU 30*a* of the smart key apparatus 10 may determine the user information of the smart key apparatus 10 from the specific information stored in the memory 30*b* and determine the language corresponding to the user information as the language corresponding to the specific information. The CPU 30*a* may transmit the request signal to the speech information center 50 through the transceiver 32 to request the center to transmit speech information in the language thus determined. Then, the speech information center 50 transmits the speech information in the language corresponding to the request signal to the smart key apparatus 10 through the communication unit 53. In this case, the database containing the specific information (or part of the specific information) and the user information (information such as the native country of the user) in association with each other is stored in the memory 30*b* of the smart key apparatus 10. The CPU 30*a* determines the user information from the specific information using the database.

Thus, the modification is advantageous in that the speech information center 50 may have a simple configuration for only transmitting speech information in the language corresponding to the request signal. Since the user information of the smart key apparatus 10 is determined from the specific information of the same to update the speech information in the language corresponding to the user information, the speech information can be appropriately updated.

As another modification to the embodiment, if the information to be used for updating the speech information includes position information, destination information, and user information, the speech information may be updated using those pieces of information based on priority instructed by the user. That is, if the above first to third embodiments are carried out in combination, the speech information may be updated based on priority of different types of information to be used for updating.

This modification has many similarities with the first to third embodiments and the modifications thereof, the description will focus on differences from those embodiments. The present modification is different from the first embodiment in that any of position information, destination information, and user information is used as information for updating the speech information.

The modification is different in that the specific information (the vehicle identification number of the vehicle on which the smart key apparatus 10 is mounted, the serial number of the smart key apparatus 10, and the like): is stored in the memory 30*b*, the name of the area (region or country) and the language spoken in the area (area information) being stored in association with the specific information. The modification includes an operating device 60 (FIG. 1) as instructing means which is connected to the speech ECU 30 and which is operable by the user to instruct the priority of position information, destination information, and user information in using those pieces of information for updating the speech information.

In this modification, the CPU 30*a* first acquires the speech information from the speech information center 50 based on the position information and the specific information (destination information and user information) and stores the speech information in the memory 30*b*. Then, the CPU 30*a* updates the speech information in the memory 30*b* based on the instruction of priority output from the operating device 60. Specifically, the CPU 30*a* of the ECU 30 provides the audio guidance using the speech information acquired based on the pieces of information (position information, destination information, and user information) used according to their priority.

The acquisition of speech information based on each type of information (position information, destination information, and user information) is carried out in the same way as in the first to third embodiments and the modifications thereof. The language acquired by the smart key apparatus 10 may be determined at either the smart key apparatus 10 or the speech information center 50 in the present modification just as done in the first to third embodiments.

Since the speech information used for audio guidance is updated by acquiring the new information from the speech information center 50 according to the position information, destination information, or user information as thus described, there is no need for pre-storing the speech information in a plurality of languages in the memory 30*b*. Thus, an increase in the storage capacity of the memory 30*b* is not necessary, and it is therefore possible to provide the audio guidance in a plurality of languages while avoiding a cost increase attributable to an increase in the storage capacity of the memory 30*b*. Further, since the operating device 60 is provided to instruct the priority of position information, destination information, and user information in using the pieces of information for updating, it is advantageous in that speech information can be updated in an optimal way for a user.

According to the present modification, the same advantage can be achieved as long as the transceiver 32 communicates with the communication unit 53 of the speech information center 50 to update the speech information in the memory 30*b* by acquiring the speech information in the language corresponding to position information, destination information, or user information from the storage unit 52 of the speech information center 50 based on the priority of the pieces of information.

Since the language corresponding to user information may be determined at the vehicle side (smart key apparatus 10), the modification is advantageous in that the speech information center 50 may have a simple configuration for only transmitting speech information in a language corresponding to a request signal.

The language corresponding to the position information, destination information, or user information is determined at the speech information center 50. The modification is therefore advantageous in that the smart key apparatus 10 can update the speech information by acquiring as the speech information the language optimal for the by using a simple configuration for only transmitting the position information, destination information, and user information to the speech information center 50.

As still another modification to the embodiment, if the information to be used for updating the speech information includes position information, destination information, and user information, the speech information may be updated using information (any of the position information, destination information, and user information) instructed by the user. That is, when the above first to third embodiments are carried out in combination, speech information may be updated based on information instructed by the user.

The present modification is different from the first embodiment in that any of position information, destination information, and user information is used as information for updating the speech information.

Further, this modification is different in that the specific information (the vehicle identification number of the vehicle on which the smart key apparatus 10 is mounted, the serial number of the smart key apparatus 10, and the like) is stored in the memory 30*b*, the name of an area (region or country) and the language spoken in the area (area information) being stored in association with the specific information. Although not shown, the modification includes an operating device 60 which is connected to the speech ECU 30 and which is operated by the user to instruct the position information, destination information, and user information in using those pieces of information for updating speech information.

In this modification, the CPU 30*a* first acquires the speech information from the speech information center 50 based on the position information and the specific information (destination information and user information) and stores the speech information in the memory 30*b*. Then, the CPU 30*a* updates the speech information in the memory 30*b* based on the instruction output from the operating device 60 indicating information to be used for updating among the position information, destination information, and user information. Specifically, the CPU 30*a* of the ECU 30 provides the audio guidance using the speech information acquired based on the instructed information (the position information, destination information, or user information).

The acquisition of speech information based on each (the of information (position information, destination information, and user information) is carried out in the same way as in the first to third embodiments and the modifications thereof. The language acquired by the smart key apparatus 10 may be determined at either the smart key apparatus 10 or the speech information center 50 in the present modification just as done in the first to third embodiments.

Since the speech information used for audio guidance is updated by acquiring new information from the speech information center 50 according to the position information, destination information, or user information as thus described, there is no need for pre-storing the speech information in a plurality of languages in the memory 30*b*. Thus, an increase in the storage capacity of the memory 30*b* can be avoided, and it is therefore possible to provide the audio guidance in a plurality of languages while avoiding a cost increase attributable to an increase in the storage capacity of the memory 30*b*. Further, since the operating device 60 is provided to instruct information to be used for updating among position information, destination information, and user information, it is advantageous in that the speech information can be updated in an optimal way for a user.

According to the present modification, the above advantage can be achieved as long as the transceiver 32 communicates with the communication unit 53 of the speech information center 50 to update the speech information in the memory 30*b* according to the instruction from the user by acquiring the speech information in a language corresponding to the position information, destination information, or user information from the storage unit 52 of the speech information center 50.

Since the language corresponding to the user information may be determined at the vehicle side (smart key apparatus 10), the modification is advantageous in that the speech information center 50 may have a simple configuration for only transmitting speech information in the language corresponding to the request signal.

The language corresponding to the position information, destination information, or user information is determined at the speech information center 50. The modification is therefore advantageous in that the smart key apparatus 10 can update the speech information by acquiring the language optimal for the by using a simple configuration for only transmitting the position information, destination information, and user information to the speech information center 50.

A plurality portable devices 40 may be registered in the smart ECU 20. That is, when a portable device 40 is used as a main key, there is a single or a plurality of sub keys having the same configuration as the portable key 40. The plurality of portable devices (the main and sub keys) may communicate with the smart ECU 20 by returning respective response signals including respective ID codes different from each other in response to the request signal.

When the audio guidance system described above is used in the smart key system, the information (position information, destination information, or user information) to be used for updating the speech information may be varied from one portable device to another. As a result, even when the vehicle (smart key apparatus 10) is used by a plurality of users each having a separate portable device, the audio guidance can be advantageously provided to each user in the language optimal for the user.

The present invention is not limited to the above exemplary embodiments. For example, the audio guidance system can be employed with an electronic apparatus such as vehicle navigation systems and home electronics.

What is claimed is:

1. An audio guidance system including a speech information center having a center-side storing means storing speech information in a plurality of languages and a center-side communication means for performing external communication and an electronic apparatus capable of communicating with the center-side communication means, the electronic apparatus comprising:

a specific information storing means storing specific information specific to the electronic apparatus, an electronic apparatus-side communication means for communicating with the center-side communication means;

an electronic apparatus-side storing means for storing speech information used for audio guidance;

a speech output means for providing audio guidance using the speech information stored in the electronic apparatus-side storing means; and an updating means for communicating with the center-side communication means through the electronic apparatus-side communication means to update the information in the electronic apparatus-side storing means by acquiring speech information in a language corresponding to the specific information stored in the specific information means from the center-side storing means;

wherein:

the updating means transmits the specific information stored in the specific information storing means to the speech information center by the electronic apparatus-side communication means; and the speech information center includes a center-side determining means for determining destination information of the electronic apparatus from the specific information and determining a language corresponding to the destination information as a language corresponding to the specific information, the center transmitting speech information in the language determined by the center-side determining means to the electronic apparatus by the center-side communication means.

2. An audio guidance system including a speech information center having a center-side storing means storing speech information in a plurality of languages and a center-side communication means for performing external communication and an electronic apparatus capable of communicating with the center-side communication means, the electronic apparatus comprising:

a specific information storing means storing specific information specific to the electronic apparatus;

an electronic apparatus-side communication means for communicating with the center-side communication means;

an electronic apparatus-side storing means for storing speech information used for audio guidance;

a speech output means for providing audio guidance using the speech information stored in the electronic apparatus-side storing means; and an updating means for communicating with the center-side communication means through the electronic apparatus-side communication means to update the speech information in the electronic apparatus-side storing means by acquiring speech information in a language corresponding to the specific information stored in the specific information storing means from the center-side storing means;

wherein:

the updating means determines destination information of the electronic apparatus from the specific information stored in the specific information storing means, determines a language corresponding to the destination information as a language corresponding to the specific information, and transmits a request signal to the speech information center by the electronic apparatus-side communication means to request the center to transmit speech information in the language thus determined; and the speech information center transmits speech information in the language corresponding to the request signal to the electronic apparatus by the center-side communication means.

3. An audio guidance system including a speech information center having a center-side storing means storing speech information in a plurality of languages and a center-side communication means for performing external communication and an electronic apparatus capable of communicating with the center-side communication means, the electronic apparatus comprising:

a specific information storing means storing specific information specific to the electronic apparatus;

an electronic apparatus-side communication means for communicating with the center-side communication means;

an electronic apparatus-side storing means for storing speech information used for audio guidance;

a speech output means for providing audio guidance using the speech information stored in the electronic apparatus-side storing means; and an updating means for communicating with the center-side communication means through the electronic apparatus-side communication means to update the speech information in the electronic apparatus-side storing means by acquiring speech information in a language corresponding to the specific information stored in the specific information storing means from the center-side storing means;

wherein:

the specific information storing means stores destination information of the electronic apparatus as part of the specific information;

the updating means determines a language corresponding to the destination information stored in the specific information storing means as a language corresponding to the specific information and transmits a request signal to the speech information center by the electronic apparatus-side communication means to request the center to transmit speech information in the language thus determined; and the speech information center transmits speech information in the language corresponding to the request signal to the electronic apparatus by the center-side communication means.

4. An audio guidance system including a speech information center having a center-side storing means storing speech information in a plurality of languages and a center-side communication means for performing communication with outside and an electronic apparatus capable of communicating with the center-side communication means, the electronic apparatus comprising:

a position detecting means for detecting a position of the electronic apparatus;

a specific information storing means storing information specific to the electronic apparatus;

an electronic apparatus-side communication means for communicating with the center-side communication means;

an electronic apparatus-side storing means for storing speech information used for audio guidance;

a speech output means for providing audio guidance using the speech information stored in the electronic apparatus-side storing means;

an updating means communicating with the center-side communication means through the electronic apparatus-side communication means to update the speech information in the electronic apparatus-side storing means by acquiring speech information in a language corresponding to the position information, speech information in a language corresponding to destination information of the electronic apparatus determined from the specific information, and speech information in a language corresponding to user information of the electronic apparatus determined from the specific information from the center-side storing means; and an instruction means for allowing the user to instruct priority of the position information, the destination information and the user information, when the updating means uses pieces of information for updating.

5. The audio guidance system according to claim 4, wherein:

the updating means transmits the position information and the specific information to the speech information center by the electronic apparatus-side communication means; and the speech information center includes a center-side determining means for determining a language corresponding to the position information and determining the destination information and the user information of the electronic apparatus from the specific information to determine a language corresponding to the destination information and the user information, the center transmitting speech information in a language determined by the center-side determining means to the electronic apparatus by the center-side communication means.

6. The audio guidance system according to claim 4, wherein:

the updating means determines a language corresponding to the position information detected by the position detecting means, determines the destination information and the user information of the electronic apparatus from the specific information stored in the specific information storing means to determine a language corresponding to the destination information and the user information, and transmits a request signal to the speech information center by the electronic side communication means to request the center to transmit speech information in a language as thus determined.

7. The audio guidance system according to claim 4, wherein:

the specific information storing means stores destination information and user information of the electronic apparatus as part of the specific information;

the updating means determines a language corresponding to the destination information and the user information stored in the specific information storing means and transmits a request signal to the speech information center with the electronic apparatus-side communication means to request the center to transmit speech information in a language thus determined; and the speech information center transmits speech information in the language corresponding to the request signal to the electronic apparatus with the center-side communication means.

8. An audio guidance system including a speech information center having a center-side storing means storing speech information in a plurality of languages and center-side communication means for performing communication with outside and an electronic apparatus capable of communicating with the center-side communication means, the electronic apparatus comprising:

a position detecting means for detecting a position of the electronic apparatus;

a specific information storing means storing specific information specific to the electronic apparatus;

an electronic apparatus-side communication means communicating with the center-side communication means;

an electronic apparatus-side storing means storing speech information used for audio guidance;

a speech output means for providing audio guidance using the speech information stored in the electronic apparatus-side storing means;

an updating means for communicating with the center-side communication means through the electronic apparatus-side communication means to update the speech information in the electronic apparatus-side storing means by acquiring speech information in a language corresponding to the position information, speech information in a language corresponding to destination information of the electronic apparatus determined from the specific information, and speech information in a language corresponding to user information of the electronic apparatus determined from the specific information from the center-side storing means; and an instruction means for allowing the user to instruct information to be used by the updating means for updating among position information, the destination information and the user information.

9. The audio guidance system according to claim 8, wherein:

the updating means transmits the position information and the specific information to the speech information center by the electronic apparatus-side communication means; and the speech information center includes a center-side determining means for determining a language corresponding to the position information and determining the destination information and the user information of the electronic apparatus from the specific information to determine a language corresponding to the destination information and the user information, the center transmitting speech information in a language determined by the center-side determining means to the electronic apparatus by the center-side communication means.

10. The audio guidance system according to claim 8, wherein:

the updating means determines a language corresponding to the position information detected by the position detecting means, determines the destination information and the user information of the electronic apparatus from the specific information stored in the specific information storing means to determine a language corresponding to the destination information and the user information, and transmits a request signal to the speech information center by the electronic side communication means to request the center to transmit speech information in a language as thus determined.

11. The audio guidance system according to claim 8, wherein:

the specific information storing means stores destination information and user information of the electronic apparatus as part of the specific information;

the updating means determines a language corresponding to the destination information and the user information stored in the specific information storing means and transmits a request signal to the speech information center by the electronic apparatus-side communication means to request the center to transmit speech information in a language thus determined; and the speech information center transmits speech information in the language corresponding to the request signal to the electronic apparatus by the center-side communication means.

* * * * *